(12) United States Patent
Kicinski

(10) Patent No.: US 6,824,694 B2
(45) Date of Patent: Nov. 30, 2004

(54) METHOD FOR TREATING WASTE BY APPLICATION OF ENERGY WAVES

(75) Inventor: Andrew J. Kicinski, Canonsburg, PA (US)

(73) Assignee: Chemco Systems L.P., Monongahela, PA (US)

( * ) Notice: Subject to any disclaimer, the term of this patent is extended or adjusted under 35 U.S.C. 154(b) by 102 days.

(21) Appl. No.: 10/286,847

(22) Filed: Nov. 4, 2002

(65) Prior Publication Data

US 2004/0084380 A1 May 6, 2004

(51) Int. Cl.$^7$ .............................. C02F 1/02; C02F 1/48
(52) U.S. Cl. ...................... 210/748; 210/749; 210/766; 210/768; 422/21
(58) Field of Search ................................ 210/609, 612, 210/742, 748, 749, 750, 751, 764, 766, 768, 770, 916; 71/12; 422/21, 22, 186

(56) References Cited

U.S. PATENT DOCUMENTS

| | | |
|---|---|---|
| 3,983,843 A | 10/1976 | Johnson |
| 4,050,907 A | 9/1977 | Brimhall |
| 4,184,956 A | 1/1980 | Azam et al. |
| 4,219,415 A | 8/1980 | Nassef et al. |
| 4,221,634 A | 9/1980 | Frost, III |
| 4,242,220 A | 12/1980 | Sato |
| 4,306,978 A | 12/1981 | Wurtz |
| 4,345,983 A | 8/1982 | Wan |
| 4,347,133 A | 8/1982 | Brigante |
| RE31,507 E | 1/1984 | Frost, III |
| 4,592,291 A | 6/1986 | Sullivan, III |
| 4,619,768 A | 10/1986 | Takahashi et al. |
| 4,631,133 A | 12/1986 | Axelrod |
| 4,687,574 A | 8/1987 | Hellman |
| 4,757,205 A | 7/1988 | Latel et al. |
| 4,825,083 A | 4/1989 | Latel et al. |
| 4,997,572 A | 3/1991 | Wurtz |
| 5,013,458 A | * 5/1991 | Christy et al. .......... 405/129.27 |
| 5,037,560 A | 8/1991 | Gayman |
| 5,091,079 A | 2/1992 | Gayman |
| 5,126,044 A | 6/1992 | Magnusson et al. |
| 5,178,755 A | 1/1993 | LaCrosse |

(List continued on next page.)

FOREIGN PATENT DOCUMENTS

| | | | |
|---|---|---|---|
| DE | 10217432 A1 | * | 11/2003 |
| WO | WO 89/09750 | * | 10/1989 |

OTHER PUBLICATIONS

"The Magic of Microwaves," Textile Chemist and Colorist & American Dyestuff Reporter, reprint from vol. 32, No. 10, Oct. 2000.

"High Temperature, Short–Time Processing," Food Technology Products & Technologies Processing, extraction from vol. 55, No. 6, Jun. 2001.

Primary Examiner—Frank M. Lawrence
(74) Attorney, Agent, or Firm—Kenyon & Kenyon

(57) ABSTRACT

The present invention relates to a method and system for treating waste materials, such as wastewater treatment plant biosolids or process wastes, by application of energy waves. In one embodiment, waste materials are treated by adding and blending an alkaline material to the waste material, and applying energy waves, such as microwaves or radio frequency waves, thereby significantly reducing pathogenic microorganisms in the waste material to meet the requirements of 40 C.F.R. 503 (2002) for producing a Class "A" product for beneficial use.

23 Claims, 3 Drawing Sheets

U.S. PATENT DOCUMENTS

| | | | |
|---|---|---|---|
| 5,196,043 A | | 3/1993 | Wurtz |
| 5,272,216 A | | 12/1993 | Clark, Jr. et al. |
| 5,287,818 A | | 2/1994 | Rajamannan |
| 5,326,530 A | * | 7/1994 | Bridges .................. 422/22 |
| 5,361,514 A | | 11/1994 | Lahoda et al. |
| 5,389,114 A | | 2/1995 | Forder |
| 5,420,039 A | | 5/1995 | Renoe et al. |
| 5,447,630 A | | 9/1995 | Rummler |
| 5,490,907 A | | 2/1996 | Weinwurm et al. |
| 5,512,178 A | | 4/1996 | Dempo |
| 5,523,514 A | | 6/1996 | Cauquil et al. |
| 5,599,137 A | | 2/1997 | Stephenson et al. |
| 5,609,769 A | | 3/1997 | Krieger |
| 5,635,059 A | | 6/1997 | Johnson |
| 5,785,847 A | | 7/1998 | Purta et al. |
| 5,840,196 A | | 11/1998 | Laurent |
| 5,843,304 A | | 12/1998 | Marchesseault et al. |
| 5,853,579 A | | 12/1998 | Rummler et al. |
| 5,868,940 A | | 2/1999 | Gurfinkel |
| 5,951,947 A | | 9/1999 | Hunt |
| 5,954,970 A | | 9/1999 | St. Louis |
| 5,968,400 A | | 10/1999 | Wicks et al. |
| 6,030,538 A | * | 2/2000 | Held .................. 210/748 |
| 6,096,219 A | | 8/2000 | Green et al. |
| 6,097,015 A | | 8/2000 | McCullough et al. |
| 6,156,172 A | | 12/2000 | Kadokura |
| 6,156,192 A | | 12/2000 | Rummler |
| 6,262,405 B1 | | 7/2001 | Wicks et al. |
| 6,398,921 B1 | | 6/2002 | Moraski |
| 6,406,510 B1 | * | 6/2002 | Burnham .................. 71/11 |
| 6,618,957 B2 | * | 9/2003 | Novak et al. .................. 34/264 |
| 2002/0046474 A1 | | 4/2002 | Novak et al. |
| 2003/0192831 A1 | * | 10/2003 | Langenecker .................. 210/663 |

* cited by examiner

METHOD FOR TREATING WASTE BY APPLICATION OF ENERGY WAVES

TECHNICAL FIELD

The present invention is directed to the treatment of waste materials containing organic matter, such as biosolids resulting from the biological treatment of wastewater. More particularly, the present invention is directed to a process and system for treating waste materials containing organic matter by adding alkaline materials such as lime to the waste materials, and further subjecting the treated waste to energy waves such as electromagnetic waves in the microwave and/or radiowave frequency ranges to produce a "Class A" sludge product, as defined by 40 C.F.R. §503 (2002), which then may be beneficially applied to land as, for example, a fertilizer or soil amendment.

BACKGROUND

The disposal of waste materials presents many concerns for the environment and the public health. Waste materials, such as wastewater treatment plant sludge, animal excrement, food wastes, and process wastes, may contain bacterial or viral pathogens and microorganisms, which, if left untreated, may pose a biological hazard to humans and the environment. Further, untreated waste materials, as well as substantially sterilized waste materials, have little or no commercial value and are typically disposed of in landfills, thereby adding to their high cost of disposal. However, in addition to unwanted pathogenic microorganisms, these waste materials often contain beneficial agricultural fertilizer nutrients such as nitrogen and phosphorus. Therefore, treatment of waste materials in a manner that produces a product satisfactory for agricultural, horticultural, or other public use, e.g. as a soil conditioner or fertilizer, may be a highly desirable form of solid waste management and may provide many beneficial uses while protecting the environment and public health. Further, as current waste treatments can take days, or even weeks, to produce a beneficial and useable treated end product, there is a need for a quick and economical waste treatment process.

Certain waste materials are subject to regulation by governmental agencies that impose restrictions on their use depending on pathogen levels and vector attraction. These agencies have established regulations for pathogen levels and vector attraction after treatment which dictate whether the resultant treated waste may be used for agricultural or other public use, or whether the treated waste must be disposed of in a landfill.

For example, the United States Environmental Protection Agency (USEPA) defines the pathogen levels and vector attraction in two different classes for regulating waste treatment methods at 40 C.F.R. §503 (2002). A "Class A" sludge, according to the USEPA regulations, is a sludge that has been treated by one of six alternative processes to either reduce the density of fecal coliform in the sewage sludge to less than 1,000 most probable number (MPN) per gram total solids (dry-weight basis), or reduce the density of Salmonella sp. bacteria in the sewage sludge to less than 3 MPN per 4 grams of total solids (dry-weight basis). 40 C.F.R. §503.32 (2002). One of these six alternatives is a "Processes to Further Reduce Pathogens" (PFRP). In addition, to qualify as a Class A sludge, the sludge must be shown to have reduced attractiveness to vectors, for which USEPA regulations provide 10 options for reducing vector attraction. 40 C.F.R. §503.33 (2002). Class A sludge, such as one treated using a PFRP, has fewer restrictions on its public use, and therefore can be used as a soil conditioner or fertilizer to fertilize cultivated fields, crops, golf courses, and public common areas such as parks.

A "Class B" sludge, as defined by 40 C.F.R. §503.32 (2002), is a sludge that may have higher levels of pathogens and consequently, more restrictions on its application to land. A Class B sludge may be achieved by one of three alternatives, one of which is a "Process to Significantly Reduce Pathogens"(PSRP). Processes approved under the more lenient PSRP level have higher pathogen thresholds. As a result, public use of waste treated under PSRP may be more restrictive, making its application to land, such as for agricultural or other public use, impractical. Thus, a PSRP end product is generally disposed of in a landfill, resulting in costly landfill fees.

Several patents disclose methods for biosolids waste treatment in which the treated waste material can be subsequently utilized for agricultural purposes and to condition soil. Pasteurization, one well-known method to treat waste, involves exposing the waste material containing pathogens to an elevated temperature for a specified period of time, thereby destroying or sterilizing harmful pathogenic microorganisms. Depending on the length of time permitted for the pasteurization reaction and the amount of reactive compounds (e.g. alkaline materials such as alkaline earth metal oxides) added to the waste materials for pasteurization, the pasteurization temperature can reach over 100 degrees Celsius. However, should the temperature of the waste material exceed 80 degrees Celsius for an extended period of time during the pasteurization process, the waste material may become sterilized from the excessive heat, thereby rendering it less beneficial for agricultural purposes. As a result, it is desirable to more closely control the temperature range during pasteurization in order to pasteurize at the optimum time and temperature for effective pathogen reduction while producing a safe and useable Class A sludge end product.

However, controlling the temperature during pasteurization may be difficult as the pasteurization temperature is dependent on several factors, including, interalia, the amount of reactive compounds added, the percent by weight of liquid in the waste material, and the length of time of the pasteurization reaction. Wide variations in the oxide content of the reactive compounds and the liquid content in each batch of waste material make it difficult to gauge the proper ratio of waste materials to reactive compounds for a complete and uniformly controlled pasteurization reaction. As a result, it is often difficult to control the pasteurization temperature at the desired level. To ensure that sterilization by pasteurization at elevated temperatures does not occur, longer pasteurization processing conducted at a lower temperature have been utilized. Some pasteurization processes are conducted over days or weeks. This adds to the overall cost of waste treatment by increasing process time.

An example of an existing waste treatment method involving pasteurization is disclosed in U.S. Pat. No. 5,013, 458 to Christy (the '458 patent). The '458 patent discloses a pasteurization method that involves retaining heat from an exothermic reaction and adding additional, supplemental heat from heating elements to neutralize the pathogens. The exothermic reaction is caused by adding an alkaline substance, such as calcium oxide, calcium carbonate, lime or quicklime, to the waste materials in sufficient quantity to raise the pH level of the waste.

Pasteurization is achieved by allowing the waste materials and alkaline substance to exothermically react in a substantially closed container for at least two hours, generating and releasing heat. The patent also discloses that the longer the reaction is held, the greater the degree of lime stabilization, and that the reaction time can be held for a number of days, or even weeks. By maintaining the temperature of the waste mixture at no less than 70 degrees Celsius for at least one half hour, the waste mixture is pasteurized to Class A sludge. External supplemental heating is supplied by placing heating elements evenly spaced around the exterior of a vessel. These intermittently-spaced supplemental heating elements can cause uneven heating, which can create sterilizing hot spots and/or underheat other areas resulting in ineffective pathogen kill.

Another example of an existing waste treatment method involving pasteurization is shown in U.S. Pat. No. 5,196,043 to Wurtz (the '043 patent). This patent describes a pasteurization waste treatment process that involves reacting the waste materials with alkaline earth metals and carbon dioxide, thereby producing two exothermic reactions which result in a useable Class A sludge product. But the '043 patent discloses a delayed exothermic reaction that requires a reaction time ranging up to 20 minutes in which the temperature can exceed 100 degrees Celsius. Thus, neither of the above referenced patents teach a quick, economic, tight temperature-controlled pasteurization method in which the waste materials are pasteurized at a lower temperature to produce a Class A sludge.

Accordingly, there is a need for an expeditious and economical method to treat waste materials to produce products beneficial for agricultural or other public use.

DETAILED DESCRIPTION

As discussed above, FIG. 1, a flow diagram, illustrates a waste treatment system, generally designated as 10, for treating waste by application of certain electromagnetic energy waves. Waste materials to be treated contain bacterial or viral pathogens and microorganisms that may be harmful to the environment and the public health, and therefore should be treated before disposal. Waste material include non-limiting examples such as wastewater plant sludge, sewage sludge, animal excrement, and food and process wastes. See, e.g., 40 C.F.R. §501 et. seq. Waste materials typically comprise a liquid and solid component. Waste can be treated to achieve Class A status by exposing the waste material containing pathogens to an elevated temperature for a specified period of time, thereby reducing pathogenic microbes to EPA Class A standards. 40 C.F.R. §503 (2002).

Figure 1:
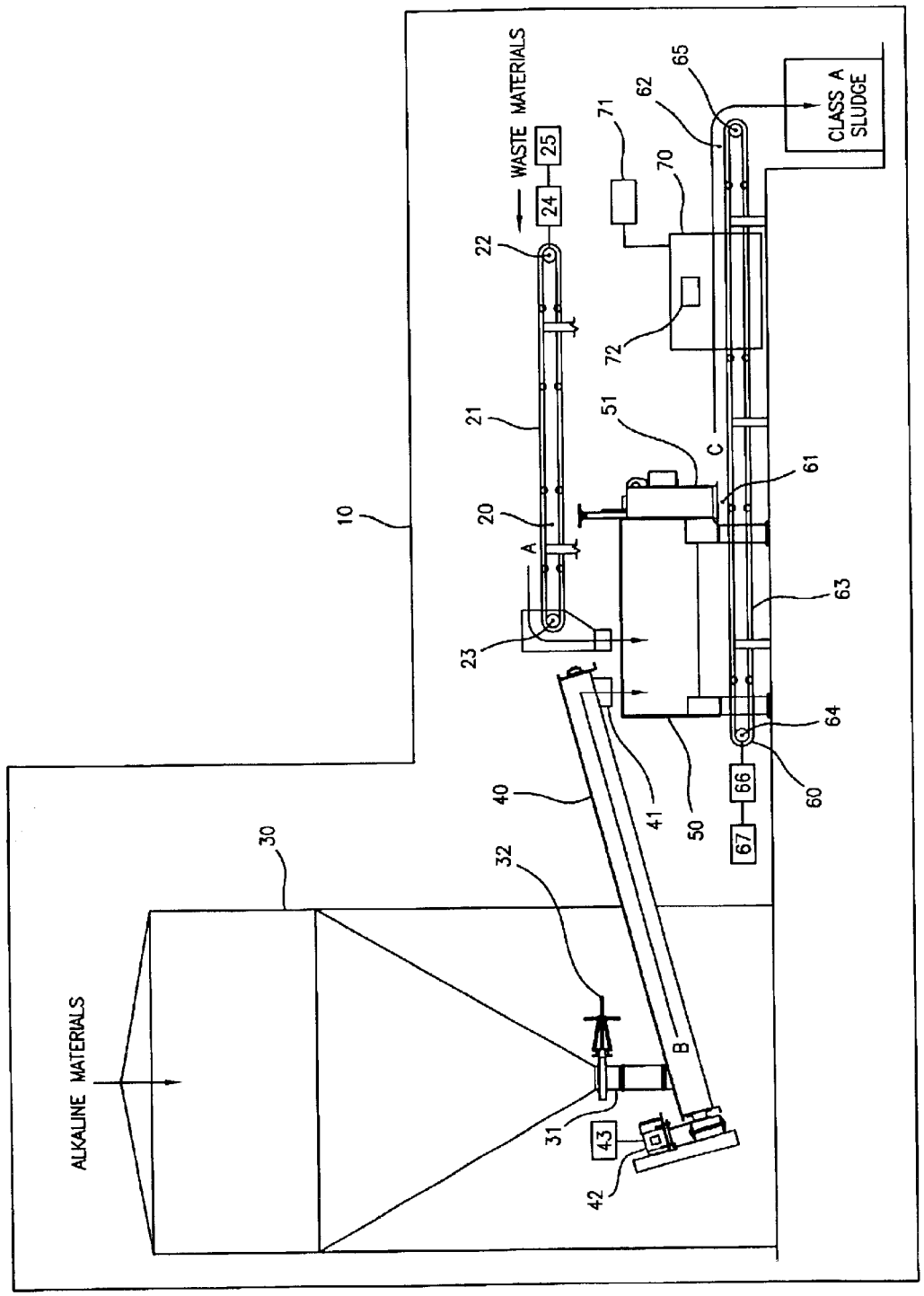
FIG. 1 is a flow diagram of an apparatus system for treating waste materials by alkaline addition and the application of electromagnetic energy waves.

The waste system 10, as shown in FIG. 1, provides a first conveyor 20, to introduce waste materials to be treated. The components of first conveyor include a belt 21, a first roller 22, and a second roller 23. Belt 21 may be made from any material that is flexible and resilient. Latex, silicone, polyurethane, rubber, plastic (including styrene and isobutylene styrene), and nylon, are each examples of materials that may be used in manufacturing the belt 21. First and second rollers, 22 and 23 respectively, can be constructed in any manner well known in the pertinent art including, but not limited to, an assembly of any of a disk, axle, roller bearings, and ball bearings. The flow arrow A demonstrates the direction of flow from the source of waste materials to a blender 50 (described below). In the illustrated preferred embodiment, first conveyor 20 can be a variable speed conveyor belt with a motor 24 controlled by a controller 25 in which the feed rate of waste materials can be adjusted. A variety of devices other than a conveyor can be utilized to introduce waste materials. Non-limiting examples include a screw feeder and gravimetric feeder.

A reservoir 30 is also provided to hold unreacted alkaline materials, such as alkaline earth metal oxides, as illustrated in FIG. 1. Reservoir 30 has bottom orifice 31 from which alkaline materials are fed to a feeder 40. Alkaline materials are distributed to feeder 40 through a valve 32, which can be selectively opened or closed, located adjacent the bottom orifice 31 of the reservoir 30. Valve 32 can be designed in any manner well known in the pertinent art, such as a slidegate valve, knifegate valve, or by other mechanical valving means. Reservoir 30 can be a gravity feed reservoir, silo, hopper, container, or bin. Reservoir 30 can be constructed from numerous materials, including carbon steel, stainless steel, plastic, and other suitably rigid polymers.

In the exemplary embodiment shown in FIG. 1, a feeder 40 is positioned adjacent the bottom orifice 31 of reservoir 30 to receive therefrom alkaline material, such as earth metal oxides, contained in reservoir 30. This feeder 40 has a motor 42 and a controller 43 that can assist in regulating the addition rate of alkaline material to the waste material. Feeder 40 is a variable speed screw feeder or similar variable speed feeder, to regulate the amount of alkaline material to be added to the waste material for exothermic reaction. The motor 42 for feeder 40 can be an electric motor or other similar motor well known in the pertinent arts. The flow arrow B demonstrates the direction of flow of the alkaline oxide through feeder 40. The alkaline oxide exits feeder 40 through exit orifice 41 of the feeder 40. Other mechanical feeder means well known in the pertinent art can be used, such as a belt conveyor, screw conveyor, variable speed screw conveyor, slide feeder, and gravimetric feeder.

First conveyor 20 and feeder 40 feed waste materials and alkaline material, respectively, into a blender 50, as shown in FIG. 1. Blender 50 uniformly mixes the alkaline material and waste material in a simultaneous fashion. Volume rates can be adjusted by altering the feed rate of feeder 40 and speed rate of first conveyor 20. The blended resultant waste mixture is then discharged from blender 50 through a blender outlet 51. A variety of mechanical means can be utilized to blend the waste materials and alkaline material. In the preferred embodiment, blender 50 is a dual shafted plow blender. One commercial embodiment of blender 50 is the Chemco Willowtech Blender/Reactor Model D-270. Additional mechanical means include a single shaft plow blender, pug mill, ribbon blender, pin mill, conventional mixer, or any other blending means that can uniformly mix the alkaline material with the waste materials. Uniform blending increases efficiency in the heat-generating chemical reaction.

A second conveyor 60, having a proximal end 61 and distal end 62, is adjacent the blender 50 wherein the blender outlet 51 of blender 50 is positioned at the proximal end 61 of the second conveyor 60 to receive the waste mixture as illustrated in FIG. 1. Second conveyor 60 transports the blended waste mixture of alkaline material and waste material from the proximal end 61 to the distal end 62 of second conveyor 60 in the direction as shown by flow arrow C. As seen in FIG. 1, the components of second conveyor 60 may include a belt 63, a first roller 64, and a second roller 65. In the preferred embodiment, second conveyor 60 is a variable speed conveyor, wherein the rate of speed can be varied by a controller 67 and a motor 66. Second conveyor 60 may be any mechanical means, including a belt conveyor, screw conveyor, variable speed conveyor, shaftless conveyor, or ribbon conveyor.

A chamber for application of electromagnetic energy waves 70 is positioned adjacent the distal end 62 of second conveyor 60 to treat the mixture of waste materials and alkaline material by exposing the waste mixture to electromagnetic energy waves, as shown in FIG. 1. The chamber 70 is a substantially closed chamber that surrounds the waste mixture to be treated, which is uniformly distributed on belt 63. Chamber 70 includes a source of energy waves 72 that emits electromagnetic energy waves such as microwaves or radiowaves. The term "microwaves" and "radiowaves" as used herein, refers to electromagnetic energy waves having frequencies within a range from about 1 megahertz (MHz) to 100 gigahertz (GHz). Energy wave source 72 can emit many other frequencies of energy waves well known in the pertinent art.

Non-limiting examples of chamber 70 include microwave chambers that uniformly distribute microwave energy. One commercial example of such a microwave chamber is a scalable planar slotted serpentined waveguide produced by Industrial Microwave Systems, Inc. These planar waveguides are used in combination with high power microwave generators and can uniformly expose waste material to about the same net amount of energy. The chamber 70 includes controller 71, as shown in FIG. 1, to control the distribution and intensity of energy waves emitted from the chamber 70 to allow for quicker processing time and uniform exposure.

Figure 2:
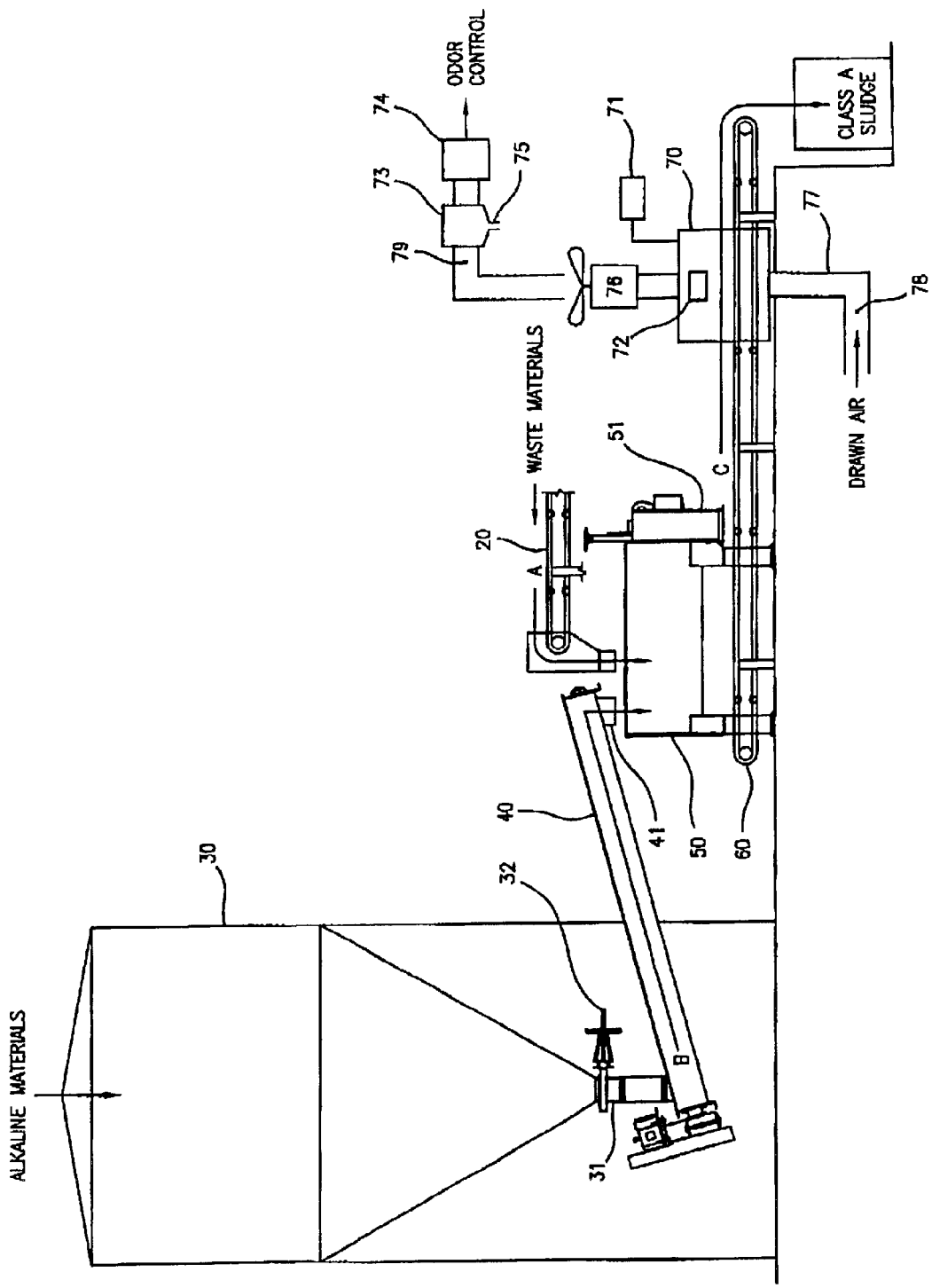
FIG. 2 is a flow diagram of an alternative embodiment of the present invention.

FIG. 2, a flow diagram, illustrates an alternate embodiment of the present invention in which offensive odors of the treated waste materials are reduced by treatment with ozone. A fan 76 is provided to draw air through an air passageway 77 as shown in FIG. 2. Air passageway 77 has a proximal end 78 and distal end 79, and is in fluid communication with chamber 70. Fan 76 is positioned adjacent the distal end 79 and draws air through air passageway 77 in a direction from proximal end 78, through chamber 70, and towards distal end 79. Alternatively, fan 76 can be positioned adjacent the proximal end 78 of air passageway 77 to push air through air passageway 77 in a direction from proximal end 78, through chamber 70, and towards distal end 79. Other mechanical fan means well known in the pertinent art may be used, such as a blower or compressor fan.

As illustrated in FIG. 2, heat exchanger 73 is positioned adjacent the distal end 79 of air passageway 77 and is in fluid communication with chamber 70 and air passageway 77. Heat exchanger 73 controls the humidity and temperature of the air to be treated for ozonation. Heat exchanger 73 has a cooling medium (not shown) to cool the air exiting chamber 70, thereby reducing the humidity and temperature of the air. The cooling medium can be any conventional mechanical cooling means well known in the pertinent art, such as cooling water pipes, a refrigeration chamber, or a chiller. Heat exchanger 73 also includes a drain 75, positioned along the bottom of heat exchanger 73, to remove condensed water from the heat exchanger 73.

In FIG. 2, ozonation source 74 is positioned adjacent heat exchanger 73 and is in fluid communication with air passageway 77, chamber 70, and heat exchanger 73. Ozonation source 74 supplies a high energy field, such as an electromagnetic field or an electrically-charged field, to react with oxygen molecules ($O_2$) in the air in air passageway 77 to form ozone oxygen molecules ($O_3$). The ozone effectively oxidizes ammonia and other organic constituents that may produce offensive odors.

Figure 3:
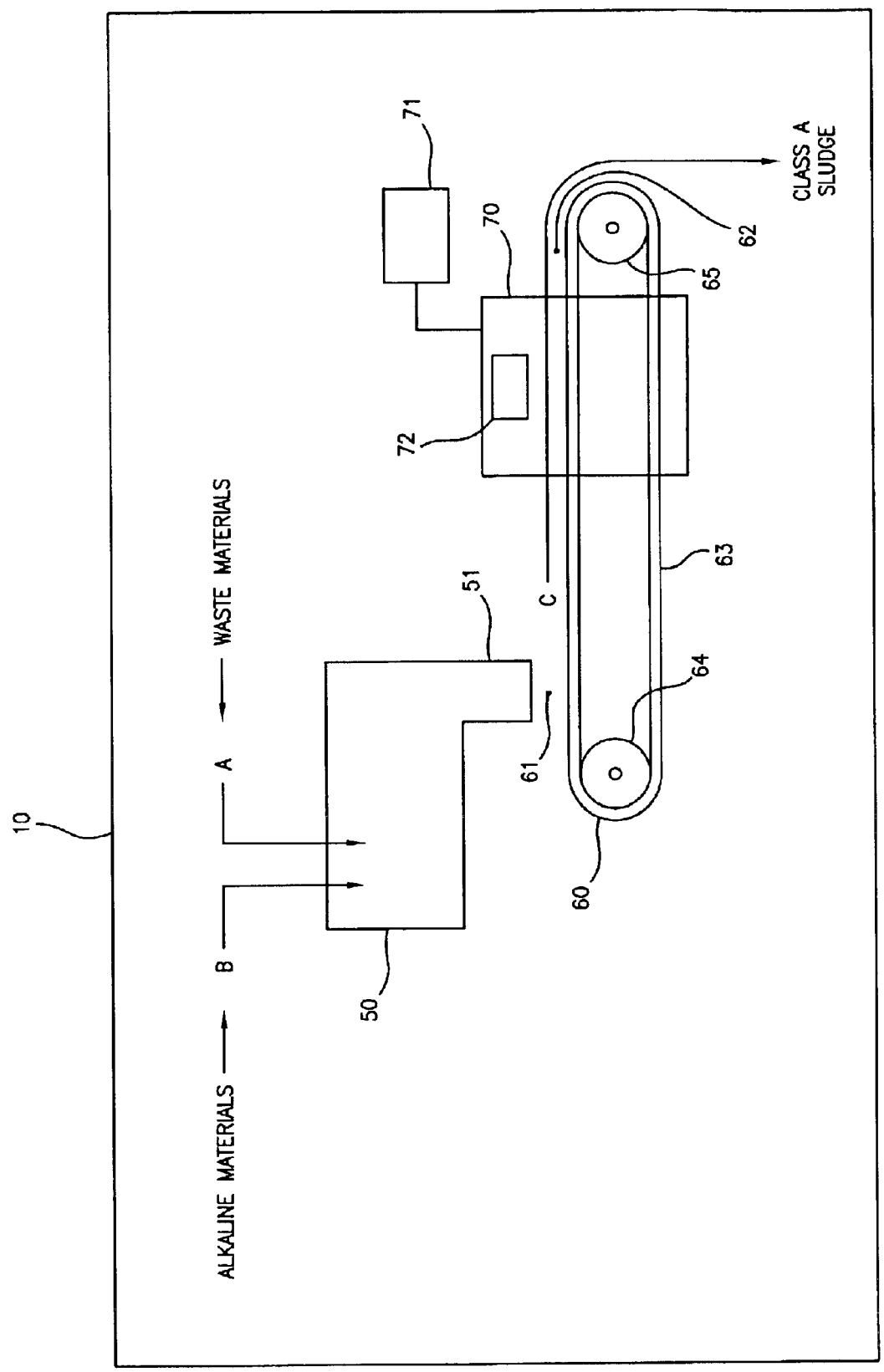
FIG. 3 is a flow diagram of an alternative embodiment of the present invention.

FIG. 3, a flow diagram, illustrates another alternate embodiment of the present invention. In FIG. 3, alkaline materials and waste materials may be provided directly from a source of alkaline materials and a source generator of waste materials, respectively, to blender 50.

The operation of the present invention will now be described in reference to FIG. 1. Waste materials to be treated are provided from a source such as a municipal or industrial treatment works. The waste materials can be dewatered waste sludge or waste having a composition ranging from 12% to 60% by weight of organic matter, such as biosolid from a municipal sewage treatment facility, and 40% to 88% by weight of liquid. The waste material biosolid content can vary widely from municipality to municipality. The waste materials may be initially dewatered by any of the many methods known in the pertinent art, such as a belt filter press, centrifuge, recessed plate and frame press, dryer, evaporation, or any combination thereof. The waste materials may also be initially chemically treated with a cationic polymer to neutralize electrical charges.

Waste materials are loaded onto the first conveyor 20 from a source of waste materials and flow in the direction of flow arrow A towards a blender 50. The first conveyor 20 can be a variable speed belt conveyor to regulate the rate of flow of waste material into blender 50. The feed rate for waste materials into blender 50 can vary from 500 to 500,000 wet pounds per hour. The waste materials can be loaded or fed onto the first conveyor 20 by any mechanical means known in the pertinent art, such as from a pump feed system, gravity feed reservoir, or other mechanical distribution system. Alternatively, the waste materials may be provided from the source generator of waste materials directly to blender 50 as shown in FIG. 3. Waste materials can be continuously delivered onto first conveyor 20, or delivered in batches.

Alkaline materials, such as earth metal oxides, are kept in a reservoir 30 and are delivered to an adjacent feeder 40 through a bottom orifice 31 of the reservoir 30. The alkaline material can flow from the reservoir 30 through the bottom orifice 31 by gravity pressure through the bottom orifice 31 into the feeder 40. A valve 32 provides a positive shutoff to the feeder 40. Alkaline material can be continuously fed into feeder 40 or delivered in batches.

The feeder 40 allocates and uniformly delivers the alkaline material to the blender 50, for uniform blending. The alkaline material flow rate can be adjusted to provide the proper ratio of alkaline material to waste material to be introduced into the blender 50. The amount of alkaline material to be added widely varies based on the type of alkaline material used and the characteristics of the sludge, such as biosolid content. For example, the amount of calcium oxide, which is one type of alkaline material and an alkaline earth metal oxide, to be added ranges from 5% to 45% by dry weight of the waste material; whereas kiln dust, another alkaline substance, ranges from 2% to 200% by dry weight of the waste material. Further, the amount of alkaline material to be added changes with the percentage of water in the waste materials. Thus, the feed rate for alkaline material into blender 50 widely varies and can range from a rate of 30 to 40,000 pounds of alkaline material per hour. In the preferred embodiment, feeder 40 is operated in a continuous mode. Alternatively, feeder 40 can operate in a batch delivery mode. Feeder 40 has an exit orifice 41 that delivers the proper amount of alkaline material to blender 50. As similarly discussed above, the feeder 40 can distribute the alkaline material into the blender 50 by either gravity pressure, or other mechanical distribution means.

Uniform blending of the alkaline material from feeder 40 with the waste materials from first conveyor 20 occurs in a blender 50, illustrated in FIG. 1. One exemplary embodiment of blender 50, the Chemco Willowtech plow blender, provides a well mixed waste material thereby increasing the efficiency of the waste treatment process. Blending the alkaline material and waste materials produces an exothermic reaction in which the mixture of the alkaline material (e.g., calcium oxide) reacts with the free water in the waste materials, producing calcium hydroxide and heat. This chemical reaction can be illustrated as follows:

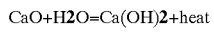

The resulting heat from the exothermic reaction reduces pathogen levels in the mixture. The amount of alkaline material added to the waste material and the length of time for the reaction is actively monitored to ensure that the temperature of the waste mixture does not exceed 80 degrees Celsius. Typically, the temperature of the mixture of waste materials and alkaline materials is maintained at a range between 50° and 70° C. The mixture is kept in the blender 50 for a time period preferably between 30 and 60 seconds. The pH level of the waste mixture rises to at least 11.5 during the reaction. In the preferred embodiment, the pH rises to a range between 11.5 and 12.5.

Several alkaline materials can be used to react with the waste materials. Non-limiting examples include calcium oxide, quicklime, kiln dust, cement kiln dust (by-product of cement processing), lime kiln dust (by-product of lime product processing), dolomitic lime, soda ash, baking soda, calcium carbonate, or mixtures of these alkaline materials. In the preferred embodiment, quicklime or calcium oxide is used to mix with the waste materials.

The mixture of waste mixture of alkaline material and waste material is expelled from blender 50 through a blender outlet 51, and delivered to a second conveyor 60 at a proximal end 61 of a second conveyor 60, as shown in FIG. 1. The mixture is uniformly distributed across second conveyor 60. In the preferred embodiment, the depth of the mixture placed on the second conveyor 60 is about 1.5 inches. Depth of the mixture can be controlled and adjusted by a leveling bar (not shown). As similarly discussed above, the blender 50 can introduce the waste mixture to the second conveyor 60 by gravity pressure, as illustrated in FIG. 1 or other mechanical distribution means. The blender 50 may be constructed from numerous materials, including carbon steel, stainless steel, or other suitably rigid metal alloys or polymers. It is preferable that the materials used are compatible with the alkaline material.

The second conveyor 60 transfers the mixture from the proximal end 61 to the distal end 62 of the second conveyor 60 in the direction illustrated by flow arrow C towards and through a chamber 70, wherein the mixture is exposed to electromagnetic energy waves in chamber 70 for further treatment as depicted in FIG. 1. A skilled artisan would appreciate that the second conveyor 60 may be any mechanical means that can move the mixture from the blender 50 to the chamber 70. The preferred embodiment of second conveyor 60 is a variable speed conveyor. The rate of speed for the variable speed conveyor belt can be controlled by a controller 67 and a motor 66, thereby controlling the time period required to move the waste materials through the chamber. This permits the operator to control the time during which the mixture is subjected to the application of energy waves in chamber 70 and the temperature to which the mixture is raised in this further treatment process. The flow rate of the mixture into chamber 70 can vary between 530 and 540,000 pounds per hour.

The chamber 70 located at the distal end 62 of second conveyor 60 receives the mixture of alkaline materials and waste materials for further treatment by application thereto of energy waves as shown in FIG. 1. The chamber 70 substantially encloses the belt of the second conveyor 60 thereby surrounding the waste mixture to be treated by application of energy waves. In chamber 70, the waste mixture is uniformly exposed to energy waves emitted from energy wave source 72 for a period of time, preferably less than 4 minutes. In the preferred embodiment, the time period required to move the waste materials through chamber 70 lasts between three and four minutes, thereby uniformly exposing the waste materials to the energy waves for three to four minutes. Alternatively, the time period may be less than three minutes if the sludge meets Class A requirements in that shortened period of time.

The energy waves agitate and excite the water molecules in the free water within the waste material, thereby generating heat through atomic motion to further raise the temperature of the mixture. The heat generated by application of the energy waves to the mixture is to be distinguished from processes known in the art, such as the '458 patent, wherein supplemental heat produced in some part of the system, such as by heating coils, is transferred to the mixture by conduction. In the second stage of the process of the present invention, heat is not transferred by conduction or convection. Rather, it is generated upon absorption of the energy waves applied to the mixture, preferably upon absorption of the energy waves by water molecules in the mixture, thereby exciting the water molecules and converting energy waves into atomic motion. So, the '458 patent transfers heat by conduction from the outside of the waste material to the interior, resulting in uneven heating. In the present invention, heat generated by atomic motion is uniformly applied throughout the waste material since the water molecules throughout the waste are evenly excited. Wave interference is minimized to further provide uniform molecular excitation.

Agitation and excitement of the water molecules within the sludge raises the temperature of the mixture. The application of energy waves upon the waste mixture is controlled so that uniform exposure enables the temperature of the waste mixture to be tightly maintained between 77 and 80 degrees Celsius. Substantial sterilization of the waste materials may result when the pasteurization temperature exceeds 80 degrees Celsius for an extended period of time, thereby thermally destroying pathogenic and beneficial non-pathogenic microorganisms. But, this may be avoided by tightly controlling the temperature and application period. Controller 71, shown in FIG. 1, controls the exposure level of the energy waves and ensures that the energy waves are uniformly applied to treat the waste mixture. Probes (not shown) also are selectively placed within chamber 70 to assist in monitoring the energy emitted from energy source 72. One non-limiting example of such a probe includes infrared probes.

The energy emitted must be tightly controlled and uniformly distributed to minimize "hot spots." Otherwise, uneven distribution and excessive wave interference can focus energy, thereby creating "hot spots" that can heat some areas of the waste mixture above 80 degrees Celsius and underheat other areas. The efficiency of microwave and radiowave applicators increase production speeds and improves resultant product quality. An ordinary person skilled in the art would appreciate that the energy waves can be microwaves, radiowaves, or any other energy waves, such as, for example sonic waves known in the pertinent art that can excite the water molecules contained in the waste mixture. Radiowaves and microwaves have frequencies that range from 1 MHz to 100 GHz. In the preferred embodiment, waste materials are exposed to energy waves in a frequency range from about 915 MHz to about 920 MHz, or in a range from about 2300 MHz to 2450 MHz for pasteurization.

After application of energy waves, the resultant end product has a composition ranging from 50% to 95% by weight of biosolid, and 5% to 50% by weight of liquid. In the preferred embodiment, the resultant product is at least 50% by weight of biosolid. In a preferred embodiment, the resultant product after treatment by energy waves, meets the EPA criteria in 40 C.F.R. §503 (2002) as a "Class A" sludge. The resultant end product can be further dried in any manner well known in the pertinent arts to increase the percentage of biosolids or reduced moisture content for commercial purposes. Further drying reduces the water mass of the end product, thereby minimizing transportation costs in handling the end product. Several non-limiting examples for drying include use of a fluidized bed dryer, rotary dryer, or other means of drying.

Thus, the resulting end product of alkaline material and waste materials is treated at a highly controlled and substantially uniform temperature sufficient to reduce or eliminate pathogenic microorganisms, yet maintain nutrients or other beneficial non-pathogenic microorganisms in the end product. This highly controlled temperature pasteurization process produces a treated product that contains many organic constituents, such as nitrogen (e.g. $NH_3$), phosphorous (e.g. $PO_4$), sulphur and soil conditioners which have beneficial commercial, agricultural, horticultural, and public use, and improve the environmental quality while protecting human health. This process can be demonstrated to meet the standards of the USEPA for PFRP, and the resultant PFRP product can be classified as Class A sludge. 40 C.F.R. §503 (2002).

The resulting PFRP Class A sludge can be utilized as a soil conditioner or fertilizer for many agricultural uses, such as for food and feed crops, horticultural and sylvicultural uses, and public uses. Non-limiting examples of beneficial public uses include fertilizing common areas, golf courses, parks, and highway roadsides, covering landfill cells, capping vegetation soil, and for land reclamation projects.

The operation of an alternate embodiment of the present invention will now be described in reference to FIG. 2. This alternate embodiment of the present invention reduces offensive odors emitted from the waste materials by treatment with ozone. Pasteurization processing reduces pathogen levels within the waste materials; however, it does not effectively reduce the odors emanating from the waste materials. To reduce odors, the alternate embodiment depicted in FIG. 2 supplies ozone to oxidize ammonia and other organic constituents that may produce offensive odors in the waste material.

In FIG. 2, as waste materials are transferred along second conveyor 60 through chamber 70, the odoriferous air within chamber 70 can be treated. The air within chamber 70 has a high moisture content, with humidity in the range of 90 to 100 percent, and an elevated temperature of at least about 50 degrees Celsius. Fan 76 creates an air current that forces the air out of chamber 70 for treatment by drawing air through air passageway 77 from proximal end 78 through chamber 70 towards distal end 79 and ozonation source 74. Alternatively, fan 76 may be positioned adjacent the proximal end 78 of air passageway 77, and can create the air current by pushing air through air passageway 77. The hot, humid air exiting chamber 70 enters heat exchanger 73, which is in fluid communication with chamber 70 and air passageway 77, where it flows over a cooling medium (not shown) within heat exchanger 73, thereby reducing the humidity and temperature of the air. The cooling medium chills the passing air, dropping the temperature to below 30° C., and reduces air humidity to a range between 40 and 60 percent. The cooling medium can chill the air by utilizing cooling water, refrigeration, a combination of cooling water and refrigeration, or any conventional method well known in the pertinent art. During the chilling process, water is condensed from the moist air and removed by gravitational separation through drain 75 of heat exchanger 73 to a municipal collection system.

The dry, cool air exits heat exchanger 73 and enters ozonation source 74, as illustrated in FIG. 2. Ozonation source 74 supplies a high energy field, such as an electromagnetic field or an electrically-charged field, to react with oxygen molecules ($O_2$) in the dry, cool air to form ozone oxygen molecules ($O_3$). One conventional method of producing ozone involves passing dried air through a strong electric current. The ozone effectively oxidizes ammonia and other organic constituents within the air that may produce offensive odors. The level of energy sufficient to eliminate offensive odors varies with the characteristics of the biosolids in the waste materials.

In another alternative embodiment (not shown), blender 50 may also be vented along with chamber 70 for humidity and odor control. Thus, odoriferous air exiting blender 50 can also be treated, separately or together with air from chamber 70, by ozonation. A second fan can force air through a second air passageway in fluid communication with blender 50 and heat exchanger 73. Alternatively, fan 76 can force air through air passageway 77 and second air passageway to control odoriferous air in chamber 70 and blender 50, respectively. Both air streams exiting blender 50 and chamber 70 through air passageway 77 and second air passageway can be combined for treatment by ozonation through heat exchanger 73 and ozonation source 74. Alternatively, odoriferous air exiting blender 50 and chamber 70 can be separately treated by ozonation through separate heat exchangers and ozonation sources.

EXAMPLE ONE

Anaerobically digested sludge (3 to 4% by weight solids) is prepared for disposal by initially dewatering the sludge with a 1.5 meter belt filter press and chemically treating the sludge with a cationic polymer to eliminate electrical charges. Dewatering is achieved by using the belt filter press at a feed rate of about 40 gallons per minute (GPM) or 700 pounds per hour of dry solids. This produces a dewatered sludge filter cake of 21% by weight of solids for subsequent treatment by pasteurization.

The sludge filter cake is placed on a conveyor belt for delivery to a Chemco WillowTech plow blender Model D-270, where alkaline materials are added to the filter cake. The dewatered sludge filter cake is introduced into the plow blender at a rate of 3333.33 pounds per hour and mixed with Quicklime (Calcium Oxide), an alkaline earth metal oxide. Quicklime is introduced into the plow blender at a rate of 210 pounds per hour. The blender mixes and retains the sludge and quicklime for one minute to ensure complete and homogeneous mixing of the materials. Mixing of the materials produces an exothermic reaction generating heat. The heat of reaction is about 50° C.

The blended sludge material is discharged from the blender and received onto another conveyor belt. The sludge is uniformly distributed across the belt at a depth of 1.5 inches and directly transferred to the energy wave applicator for pasteurization at a rate of approximately 3540 pounds per hour. There, the full volume of sludge is subjected to electromagnetic energy waves, e.g. radiowaves or microwaves, at a wave frequency of 917 megahertz for a period of four minutes. The waste material enters the energy wave applicator at a temperature of 50° C. After the waste material is subjected of energy waves, its temperature is raised to 79° C. The temperature during treatment in the energy wave applicator is tightly controlled and monitored by four infrared probes. After exposure to the energy waves, a Class A sludge product is produced that is suitable for beneficial use under USEPA regulations (40C.F.R. §503 (2002)).

EXAMPLE TWO

Aerobically digested sludge is dewatered using a 0.9 meter belt filter press to produce a sludge filter cake of 17% by dry weight of solids. The filter cake is discharged onto a continuous conveyor and delivered to a Chemco Willow-Tech Model D-270 blender at a rate of 1585 pounds per hour. At the blender, quicklime added at a rate of about 40% of the dry weight of the sludge (approximately a rate of 108 pounds of quicklime per hour). The quicklime and waste materials are mixed for one minute in the blender, thereby producing a strong exothermic reaction which raises the temperature of the waste materials to 55° C. Thereafter, the sludge is discharged from the blender directly to another conveyor belt and transported to the energy wave applicator. The sludge enters the applicator at a rate of approximately 1693 pounds per hour and is exposed to electromagnetic energy waves at a frequency of 917 megahertz for a period of four minutes. During exposure to energy waves, the sludge experiences a rise in temperature to 79° C. and undergoes pathogenic reduction, killing bacteria sufficiently to meet USEPA requirements under 40 C.F.R. §503 (2002) regulations, thereby producing Class A sludge for beneficial use.

EXAMPLE THREE

A municipal sewage treatment facility generates about 2200 pounds per hour of 24% solids by weight of anaerobically digested sludge organic matter. The sludge is dewatered by a 1.5 meter belt filter press and the resultant dewatered sludge filter cake is discharged onto a conveyor for delivery to a Chemco WillowTech Model D-270 blender. At the blender, quicklime is added at a rate of 35% of waste material by dry weight, i.e. a rate of about 185 pounds of quicklime per hour. After quicklime addition, the sludge undergoes an exothermic reaction and achieves a temperature of 53° C. The sludge is uniformly distributed across a conveyor belt at a depth of 1.5 inches. The full volume of the sludge is then exposed to energy waves at a frequency of 917 megahertz for four minutes, which results in a temperature rise to 79° C. The sludge upon discharge from the energy wave applicator meets the requirements of USEPA regulations under 40 C.F.R. §503 (2002) for classification as a Class "A" sludge.

One of skill in the art will realize that the examples described and illustrated herein are merely illustrative, as numerous other embodiments may be implemented without departing from the spirit and scope of the present invention.

What is claimed is:

1. A method for treating waste materials comprising:

providing waste material comprising from about 12% to about 60% by weight of solids, and from about 40% to about 88% by weight of liquid;

adding an alkaline material to the waste material to form a mixture;

blending the mixture sufficiently to cause a heat-generating reaction that elevates the temperature of the mixture;

applying energy waves to the mixture to further elevate the temperature of the mixture; and said blending step and said applying energy waves step being accomplished for a time sufficient to kill substantially all pathogens.

2. The method of claim 1 further comprising:

recovering a sludge product.

3. The method of claim 2, wherein the sludge product is a Class A sludge, as defined under 40 C.F.R. §503 (2002)/ 1993, in which the density of fecal coliform in the sludge is reduced to less than 1,000 most probable number (MPN) per gram total solids (dry-weight basis), or the density of Salmonella sp. bacteria in the sludge is reduced to less than 3 MPN per 4 grams of total solids (on a dry-weight basis).

4. The method of claim 1 further comprising:

removing water from the waste material prior to addition thereto of the alkaline material.

5. The method of claim 1 wherein the alkaline material is selected from the group consisting of calcium oxide, quicklime, cement kiln dust, lime kiln dust, dolomitic lime, soda ash, baking soda, calcium carbonate and mixtures thereof.

6. The method of claim 1 wherein blending the waste material and alkaline material raises the pH of the mixture.

7. The method of claim 6 wherein the pH is raised to at least about 11.5.

8. The method of claim 1 wherein the heat-generating reaction raises the temperature of the mixture to a temperature between about 50 and about 70 degrees Celsius.

9. The method of claim 1 further comprising:

controlling the temperature of the mixture in a range of between about 77 to about 80 degrees Celsius during application of energy waves.

10. The method of claim 9 wherein the application of energy waves occurs for a time period of less than about four minutes.

11. The method of claim 10 wherein the application of energy waves occurs for a time period of between about three and about four minutes.

12. The method of claim 1 wherein the energy waves comprise microwaves.

13. The method of claim 1 wherein the energy waves comprise radiowaves.

14. The method of claim 2 wherein said sludge product comprises from about 50% to about 95% by weight of solids, and from about 5% to about 50% by weight of liquid.

15. The method of claim 1 further comprising:

reducing odors by ozonating air in contact with the sludge during application of the energy waves.

16. The method of claim 15 further comprising:

venting the air after treating with ozone.

17. A method for treating waste materials to form a sludge comprising:

providing waste material;

adding an alkaline material to the waste material to form a mixture;

blending the mixture with an alkaline thereby causing a heat-generating reaction that elevates the temperature of the mixture exposing the mixture to electromagnetic energy waves to further elevate the temperature of the mixture.

18. The method of claim 17 wherein said energy waves comprise microwaves.

19. The method of claim 18, wherein the microwaves are applied to the mixture for a period of between about three and about four minutes.

20. The method of claim 17 wherein said energy waves comprise radiowaves.

21. The method of claim 20, wherein the radiowaves are applied to the mixture for a period of between about three and about four minutes.

22. A method for treating waste materials to form a sludge comprising:

providing waste material comprising from about 12% to about 60% by weight of solids, and from about 40% to about 88% by weight of liquid;

adding an alkaline material to the waste material to form a mixture;

blending the mixture sufficiently to cause a heat-generating reaction that elevates the temperature of the mixture;

exposing the mixture to energy waves to further elevate the temperature of the mixture;

controlling the temperature of the mixture in a range of between about 77 to about 80 degrees Celsius during the exposure of energy waves, wherein the exposure of energy waves occurs for a time period of less than about four minutes to prevent substantial sterilization of the mixture; and recovering a sludge product, wherein the sludge product has been treated to reduce the density of fecal coliform or Salmonella sp. bacteria without substantially sterilizing the sludge product to maintain beneficial agricultural fertilizer nutrients.

23. The method of 22 wherein the energy waves comprise radiowaves.

\* \* \* \* \*

UNITED STATES PATENT AND TRADEMARK OFFICE
CERTIFICATE OF CORRECTION

PATENT NO. : 6,824,694 B2
DATED : November 30, 2004
INVENTOR(S) : Andrew J. Kicinski It is certified that error appears in the above-identified patent and that said Letters Patent is hereby corrected as shown below:

Column 12,
Line 31, delete "(on a dry-weight basis)" and insert -- on a dry-weight basis --.

Signed and Sealed this

Twelfth Day of July, 2005

JON W. DUDAS
*Director of the United States Patent and Trademark Office*